(12) United States Patent
Dura et al.

(10) Patent No.: US 9,203,788 B2
(45) Date of Patent: Dec. 1, 2015

(54) SYSTEM AND METHOD FOR COMMUNICATING INSTANT MESSAGE INFORMATION BETWEEN AN INSTANT MESSAGING NODE AND ONE OR MORE PROGRAMS

(75) Inventors: Daniel Dura, San Francisco, CA (US); Kevin Lynch, San Francisco, CA (US)

(73) Assignee: Adobe Systems Incorporated, San Jose, CA (US)

(*) Notice: Subject to any disclaimer, the term of this patent is extended or adjusted under 35 U.S.C. 154(b) by 1783 days.

(21) Appl. No.: 11/282,217

(22) Filed: Nov. 18, 2005

(65) Prior Publication Data

US 2014/0040383 A1 Feb. 6, 2014

Related U.S. Application Data

(60) Provisional application No. 60/629,454, filed on Nov. 18, 2004, provisional application No. 60/629,455, filed on Nov. 18, 2004, provisional application No. 60/629,503, filed on Nov. 18, 2004.

(51) Int. Cl.
*G06F 15/16* (2006.01)
*H04L 12/58* (2006.01)
*H04L 29/06* (2006.01)
*G06F 9/54* (2006.01)

(52) U.S. Cl.
CPC .............. *H04L 51/046* (2013.01); *G06F 9/543* (2013.01); *H04L 29/06414* (2013.01)

(58) Field of Classification Search
CPC .. H04L 51/046; H04L 29/06414; G06F 9/543
USPC ......................................................... 709/206
See application file for complete search history.

(56) References Cited

U.S. PATENT DOCUMENTS

| | | |
|---|---|---|
| 5,157,763 A | 10/1992 | Peters et al. |
| 5,301,268 A | 4/1994 | Takeda |
| 5,555,416 A | 9/1996 | Owens et al. |
| 5,606,674 A | 2/1997 | Root |
| 5,625,809 A | 4/1997 | Dysart et al. |
| 5,694,563 A | 12/1997 | Belfiore et al. |
| 5,781,192 A | 7/1998 | Kodimer |
| 5,784,058 A | 7/1998 | LaStrange et al. |
| 5,801,693 A | 9/1998 | Bailey |

(Continued)

FOREIGN PATENT DOCUMENTS

| | | |
|---|---|---|
| WO | WO 00/43913 | 7/2000 |
| WO | WO 00/49545 | 8/2000 |

OTHER PUBLICATIONS

Corporate Portals Letter, vol. 1, No. 10, Oct. 2000.

(Continued)

*Primary Examiner* — Kristie Shingles
*Assistant Examiner* — Keyvan Emdadi
(74) *Attorney, Agent, or Firm* — Shook, Hardy & Bacon L.L.P.

(57) ABSTRACT

A system and method receives and stores instant messaging messages, and provides them upon request by one or more programs, such messages containing text, status of other users or other information. Instant messages received from programs may also be provided as instant messages using the system and method. The programs may be validated before allowing them to communicate using the instant messaging network.

24 Claims, 3 Drawing Sheets

(56) References Cited

U.S. PATENT DOCUMENTS

| | | | |
|---|---|---|---|
| 5,835,777 A | 11/1998 | Staelin | |
| 5,886,699 A | 3/1999 | Belfiore et al. | |
| 5,924,099 A | 7/1999 | Guzak et al. | |
| 5,999,740 A | 12/1999 | Rowley | |
| 6,009,274 A | 12/1999 | Fletcher et al. | |
| 6,028,965 A | 2/2000 | Normile | |
| 6,061,058 A | 5/2000 | Owens et al. | |
| 6,067,582 A | 5/2000 | Smith et al. | |
| 6,125,388 A | 9/2000 | Reisman | |
| 6,216,152 B1 | 4/2001 | Wong et al. | |
| 6,272,493 B1 | 8/2001 | Pasquali | |
| 6,314,565 B1 | 11/2001 | Kenner et al. | |
| 6,321,209 B1 | 11/2001 | Pasquali | |
| 6,378,128 B1 | 4/2002 | Edelstein et al. | |
| 6,418,555 B2 | 7/2002 | Mohammed | |
| 6,434,563 B1 | 8/2002 | Pasquali et al. | |
| 6,535,882 B2 | 3/2003 | Pasquali | |
| 6,557,054 B2 | 4/2003 | Reisman | |
| 6,606,744 B1 | 8/2003 | Mikurak | |
| 6,618,716 B1 | 9/2003 | Horvitz | |
| 6,636,856 B2 | 10/2003 | Pasquali | |
| 6,654,765 B2 | 11/2003 | Wong et al. | |
| 6,658,419 B2 | 12/2003 | Pasquali | |
| 6,687,745 B1 | 2/2004 | Franco et al. | |
| 6,757,365 B1 * | 6/2004 | Bogard | 379/88.17 |
| 6,785,885 B2 | 8/2004 | Norris et al. | |
| 6,803,929 B2 | 10/2004 | Hinegardner et al. | |
| 6,839,714 B2 | 1/2005 | Wheeler et al. | |
| 6,904,569 B1 | 6/2005 | Anderson | |
| 6,944,821 B1 | 9/2005 | Bates et al. | |
| 6,961,907 B1 | 11/2005 | Bailey | |
| 7,080,139 B1 * | 7/2006 | Briggs et al. | 709/224 |
| 7,085,817 B1 | 8/2006 | Tock et al. | |
| 7,127,405 B1 * | 10/2006 | Frank et al. | 705/1 |
| 7,155,729 B1 | 12/2006 | Andrew et al. | |
| 7,263,545 B2 * | 8/2007 | Digate et al. | 709/206 |
| 7,287,097 B1 | 10/2007 | Friend et al. | |
| 7,293,242 B2 | 11/2007 | Cossey | |
| 7,296,244 B2 | 11/2007 | Martinez et al. | |
| 7,299,259 B2 * | 11/2007 | Petrovykh | 709/205 |
| 7,305,453 B2 | 12/2007 | Awamoto et al. | |
| 7,310,781 B2 | 12/2007 | Chen et al. | |
| 7,337,210 B2 * | 2/2008 | Barsness | 709/204 |
| 7,370,278 B2 | 5/2008 | Malik | |
| 7,383,308 B1 * | 6/2008 | Groves et al. | 709/206 |
| 7,383,356 B2 | 6/2008 | Gargi | |
| 7,386,841 B2 | 6/2008 | Huang | |
| 7,392,306 B1 | 6/2008 | Donner et al. | |
| 7,395,500 B2 | 7/2008 | Whittle et al. | |
| 7,434,048 B1 | 10/2008 | Shapiro et al. | |
| 7,451,218 B2 * | 11/2008 | Malik et al. | 709/225 |
| 7,478,336 B2 | 1/2009 | Chen et al. | |
| 7,487,550 B2 | 2/2009 | Todd | |
| 7,496,633 B2 * | 2/2009 | Szeto et al. | 709/206 |
| 7,600,189 B2 | 10/2009 | Fujisawa | |
| 7,617,458 B1 | 11/2009 | Wassom et al. | |
| 7,640,293 B2 * | 12/2009 | Wilson et al. | 709/203 |
| 7,912,206 B2 * | 3/2011 | Miller et al. | 379/265.09 |
| 2001/0034244 A1 * | 10/2001 | Calder et al. | 455/556 |
| 2002/0049633 A1 | 4/2002 | Pasquali | |
| 2002/0055975 A1 * | 5/2002 | Petrovykh | 709/205 |
| 2002/0065110 A1 | 5/2002 | Enns et al. | |
| 2002/0069264 A1 | 6/2002 | Pasquali | |
| 2002/0080179 A1 | 6/2002 | Okabe et al. | |
| 2002/0103902 A1 | 8/2002 | Nagel et al. | |
| 2003/0050932 A1 | 3/2003 | Pace et al. | |
| 2003/0065723 A1 * | 4/2003 | Kumhyr et al. | 709/206 |
| 2003/0208491 A1 | 11/2003 | Pasquali | |
| 2004/0093563 A1 | 5/2004 | Pasquali | |
| 2004/0111478 A1 * | 6/2004 | Gross et al. | 709/206 |
| 2004/0117443 A1 * | 6/2004 | Barsness | 709/204 |
| 2004/0143633 A1 * | 7/2004 | McCarty | 709/206 |
| 2004/0162881 A1 * | 8/2004 | Digate et al. | 709/206 |
| 2004/0186918 A1 | 9/2004 | Lonnfors et al. | |
| 2004/0205134 A1 * | 10/2004 | Digate et al. | 709/206 |
| 2005/0021652 A1 | 1/2005 | McCormack | |
| 2005/0049960 A1 | 3/2005 | Yeager | |
| 2005/0080867 A1 * | 4/2005 | Malik et al. | 709/207 |
| 2005/0086290 A1 * | 4/2005 | Joyce et al. | 709/202 |
| 2005/0097061 A1 | 5/2005 | Shapiro et al. | |
| 2005/0097473 A1 * | 5/2005 | Malik et al. | 715/739 |
| 2005/0172241 A1 | 8/2005 | Daniels et al. | |
| 2005/0198581 A1 | 9/2005 | Soderberg et al. | |
| 2005/0203892 A1 * | 9/2005 | Wesley et al. | 707/3 |
| 2005/0210401 A1 | 9/2005 | Ketola et al. | |
| 2005/0257128 A1 | 11/2005 | Pasquali et al. | |
| 2005/0262521 A1 | 11/2005 | Kesavarapu | |
| 2006/0025091 A1 * | 2/2006 | Buford | 455/154.2 |
| 2006/0085796 A1 | 4/2006 | Hoerle et al. | |
| 2006/0095524 A1 * | 5/2006 | Kay et al. | 709/206 |
| 2006/0271526 A1 * | 11/2006 | Charnock et al. | 707/3 |

OTHER PUBLICATIONS

Focus on HP OpenView, Nathan J. Muller, Mar. 1995, Chapters 8, 9, 10.

RealPresenter Plug-in, User's Guide Version 5.0, Real NetworksInc., 1998, 29 pages.

Netscape 7.1 Upgrade Guide, 8 pages, 2003.

Lambert, Karine, Authorized Officer, European Patent Office, International Search Report, Application No. PCT/US2008/066184, mailed Nov. 6, 2008, 15 pages.

Lambert, Karine, Authorized Officer, European Patent Office, International Search Report, Application No. PCT/US2008/066188, mailed Nov. 6, 2008, 15 pages.

Sun Microsystems, Inc., Java™ Network Launching Protocol & API Specification (JSR-56) Version 1.5 [Online] May 2001, XP007906066. Retrieved from the Internet: URL:http://cds.sun.com/is-bin/INTERSHOP.enfinity/WFS/CDS-CDS_Developer-Site/en_US/-/USD/VerifyItem-Start/jnlp-1_5-mr-spec.pdf?BundledLineItemUUID=gvVIBe.pDpoAAAEdPR1iMS9Y&OrderID=0Q51Be.pB8IAAAEdMBliMS9Y&ProductID=fL_ACUFB1v0AAAEY2U45AXuV&FileName=/jnlp-1_5-mr-spec.pdf> (Retrieved on Nov. 24, 2008), pp. 1-85.

Sun Microsystems, Inc., "Auto Downloading JREs using Java™ Web Start and Java™ Plug-in" [Online] Feb. 2007, pp. 1-3, XP007906067. Retrieved from the Internet: URL: http://web.archive.org/web/20070207051627/http://java.sun.com/j2se/1.5.0/docs/guide/javaws/developersguide/autod1.03.06.html> (Retrieved on Nov. 28, 2004).

Sun Microsystems, Inc., Packaging JNLP Applications in a Web Archive, Java™ Web Start 1.4.2 [Online] Aug. 2005, pp. 1-11, XP007906068. Retrieved from the Internet: URL: http://web.archive.org/web/20050828081147/http://java.sun.com/j2se/1.4.2/docs/guide/jws/downloadservletguide.html> (Retrieved on Nov. 28, 2004).

Phillip J. Windley, "REST: Representational State Transfer," Chapter 11, Mar. 22, 2005, pp. 237-261.

Office Action, U.S. Appl. No. 11/090,402 mailed Nov. 19, 2007, 9 pages.

Final Office Action, U.S. Appl. No. 11/090,402 mailed Jul. 22, 2008, 18 pages.

Office Action, U.S. Appl. No. 11/090,402 mailed Jan. 9, 2009, 18 pages.

Office Action, U.S. Appl. No. 11/089,699 mailed Jun. 25, 2008, 122 pages.

Office Action, U.S. Appl. No. 11/089,699 mailed Dec. 15, 2008, 8 pages.

Office Action, U.S. Appl. No. 11/089,699 mailed Jul. 9, 2009, 10 pages.

Office Action, U.S. Appl. No. 11/090,741 mailed Aug. 28, 2008, 26 pages.

Final Office Action, U.S. Appl. No. 11/090,741 mailed Mar. 6, 2009, 40 pages.

Office Action, U.S. Appl. No. 11/280,714 mailed Jun. 11, 2009, 27 pages.

(56) References Cited

OTHER PUBLICATIONS

Office Action, U.S. Appl. No. 11/282,916 mailed Jan. 28, 2009, 15 pages.
Final Office Action, U.S. Appl. No. 11/282,916 mailed Jul. 9, 2009, 26 pages.
Kolehmainen et al., U.S. Appl. No. 60/513,050, titled: Systems and Methods for Facilitating Software Development and Communications Efficacy, filed Oct. 21, 2003, 39 pages.
U.S. Appl. No. 11/282,916, filed Nov. 18, 2005, Office Action dated Jul. 9, 2009, to be published by the USPTO, 26 pages.
U.S. Appl. No. 11/090,741, Non-Final Office Action dated Jan. 7, 2010, to be published by United States Patent and Trademark Office, 51 pages.
U.S. Appl. No. 11/090,402, Non-Final Office Action dated Aug. 6, 2009, to be published by United States Patent and Trademark Office, 24 pages.
U.S. Appl. No. 11/280,714, Final Office Action dated Dec. 24, 2009, to be published by United States Patent and Trademark Office, 34 pages.
Muller, Nathan J., "Focus on OpenView," Chapters 8, 9 and 10 (Mar. 1995).
U.S. Appl. No. 11/090,402, Final Office Action dated Mar. 8, 2010, to be published by the United States Patent and Trademark Office, 34 pages.
U.S. Appl. No. 11/282,266, filed Nov. 18, 2005, Non-Final Office Action dated Apr. 12, 2010, to be published by United States Patent and Trademark Office, 22 pages.

* cited by examiner

SYSTEM AND METHOD FOR COMMUNICATING INSTANT MESSAGE INFORMATION BETWEEN AN INSTANT MESSAGING NODE AND ONE OR MORE PROGRAMS

RELATED APPLICATIONS

This application claims the benefit of U.S. provisional application Ser. No. 60/629,454 entitled, "SYSTEM AND METHOD FOR PROVIDING NOTICES TO USERS OF A COMPUTER PROGRAM IN A FLEXIBLE WAY" Filed on Nov. 18, 2004 by Ethan Malasky, Stephanie Goss, Kevin Lynch, David Calaprice and Alexander Magee; U.S. provisional application Ser. No. 60/629,455 entitled, "METHOD AND APPARATUS FOR COMMUNICATING DATA AMONG TWO OR MORE PROGRAMS" filed on Nov. 18, 2004 by Thomas Reilly, Kevin Lynch, Ethan Malasky and Alexander Magee; and U.S. provisional application Ser. No. 60/629,503, entitled "METHOD AND APPARATUS FOR COMMUNICATING INSTANT MESSAGE INFORMATION BETWEEN AN INSTANT MESSAGING NODE AND ONE OR MORE PROGRAMS" Filed on Nov. 18, 2004 By Daniel Dura and Kevin Lynch, each having the same assignee as the present application and each is incorporated by reference herein in its entirety.

The subject matter of this application is related to the subject matter of U.S. patent application Ser. No. 11/090,402 entitled, "System and Method for Communicating Information Over a Network" filed on Mar. 25, 2005 by Kevin Lynch, David Calaprice, Ethan Malasky and Tracy Stampfli, and U.S. patent application Ser. No. 11/089,699, entitled, System and Method for Installing One or More Programs and at Least a Portion of Their Environment" filed on Mar. 25, 2005 by Kevin Lynch, Tracy Stampfli, Peter Grandmaison and Rebekah Hash, and U.S. patent application Ser. No. 11/090,741 entitled, "System and Method for Updating One or More Programs and Their Environment" filed on Mar. 25, 2005 by Tracy Stampfli and Rebekah Hash, each having the same assignee as this application and all are hereby incorporated herein by reference in its entirety.

FIELD OF THE INVENTION

The present invention is related to computer software and more specifically to computer software for communicating instant messaging information.

BACKGROUND OF THE INVENTION

Instant message applications allow parties to transmit text messages between computers remotely located from one another via a server, and to determine the status of "buddies" or individuals with usernames known to the user of the application. Writing an instant message application can entail a great deal of programming activity, and, because messages must be accepted when they arrive, an application must be written specially to accept such messages at any time.

It would be desirable to allow conventional applications that may have functionality different from conventional instant messaging applications and that operate on remotely-located computer systems, to communicate with one another or to allow conventional applications to identify status of remotely-located users or other programs via an instant messaging communication system. Such a capability would allow the applications to employ the instant messaging infrastructure to communicate instant information or to identify the status of other users or programs, without having to reproduce that infrastructure. However, because many applications are not written in a manner to allow them to receive messages at any time, applications cannot employ conventional instant messaging communication infrastructure to communicate among one another. Even if such applications were modified to accept messages as they arrive, each application would be required to supply instant messaging functionality, a time-consuming and memory wasting approach. Furthermore, the operator of a conventional instant messaging network may not wish to allow unauthorized applications to use its network.

What is needed is a system and method that can allow applications that are not structured to receive messages at any time to use an instant messaging network in order to communicate information and identify status of one or more users of the instant messaging network, without writing an entire instant message application, and without requiring that the operator of an existing instant messaging network allow such communication by all applications.

SUMMARY OF INVENTION

A system and method acts as a relay between a conventional instant messaging node, such as a conventional instant messaging server, and one or more programs, storing messages received from an instant messaging network and providing them to one or more programs as requested by those programs according to criteria the programs provide. The system and method can also receive messages from the program and provide it into the instant messaging network for receipt by another party on that network. A program identifier is received from the program that authenticates the program to the instant messaging network. If the program identifier does not match an identifier approved by the instant messaging network, the instant messaging network can reject the message, thereby allowing the operator to maintain control over the use of its instant messaging network. The system and method allows the one or more programs to instruct it to delete messages it has stored or the system and method automatically deletes such messages. The system and method also allows any of the programs to modify the buddy list for which status messages are provided by the instant messaging server to the system and method.

DETAILED DESCRIPTION OF A PREFERRED EMBODIMENT

Figure 1:
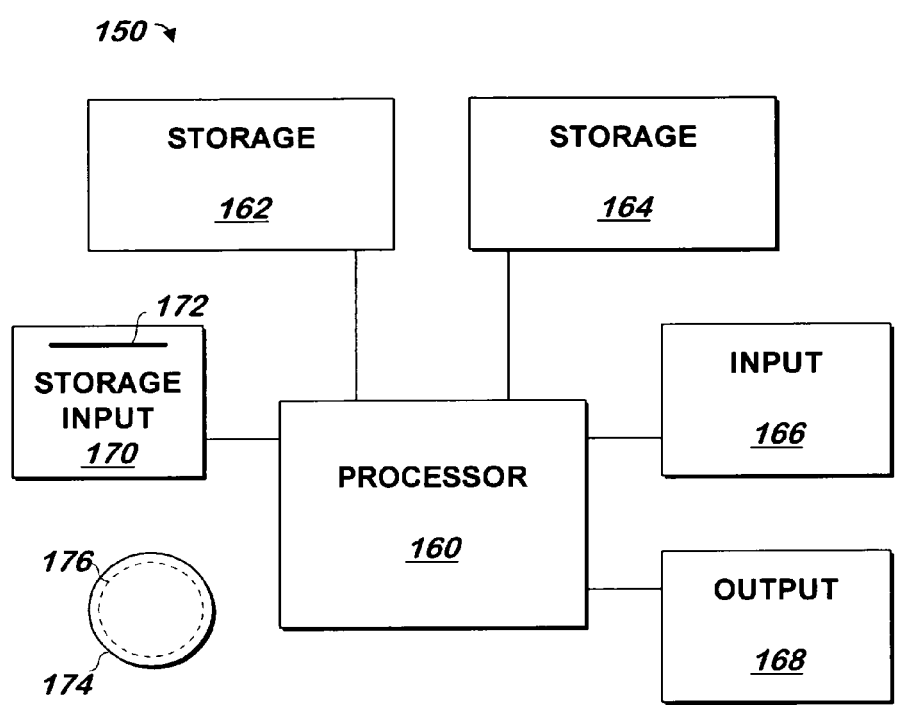
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond, Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
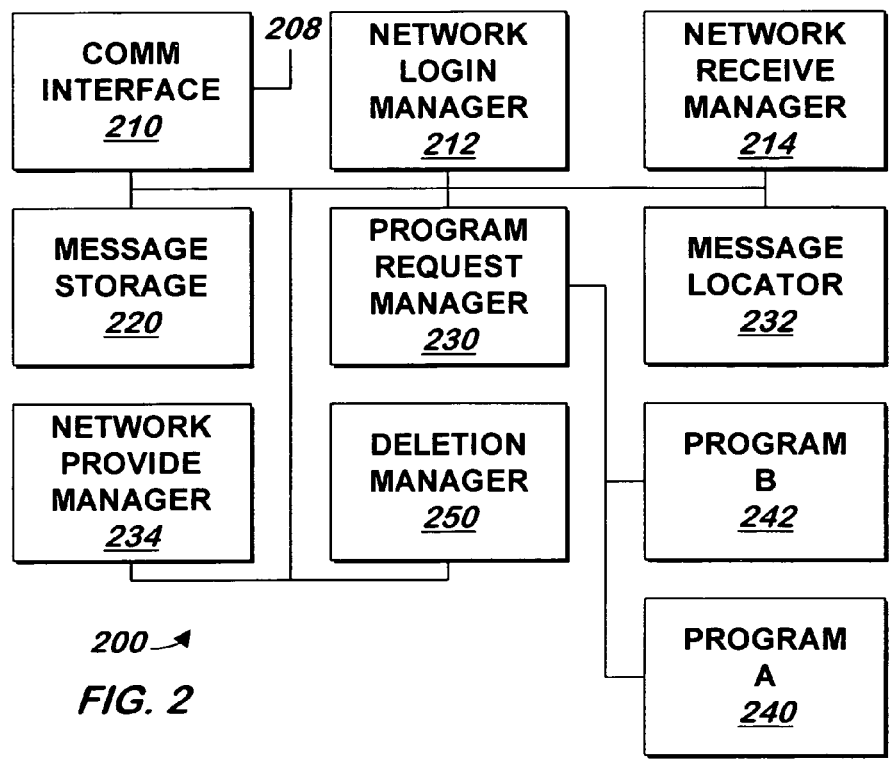
FIG. 2 is a block schematic diagram of a system for providing instant messaging information according to one embodiment of the present invention.
Figure 3:
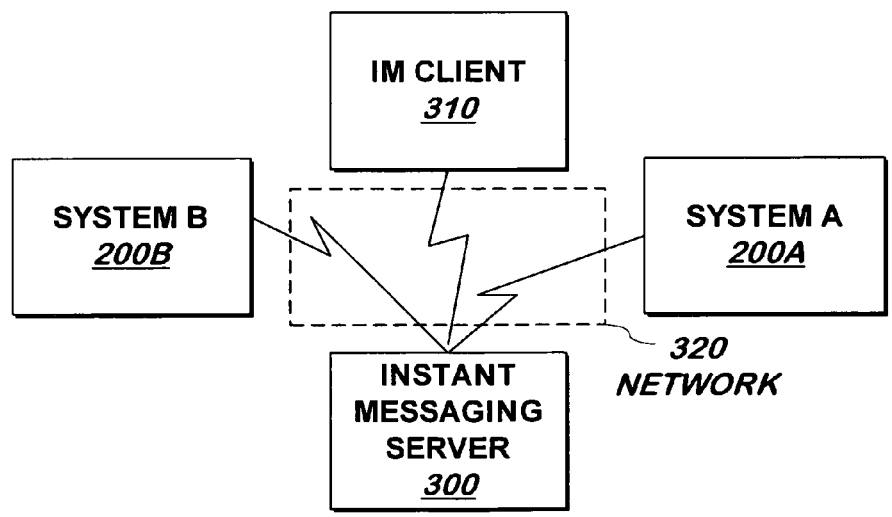
FIG. 3 is a block schematic diagram of two systems similar to that of FIG. 2 coupled to a network, an instant messaging server and a conventional instant messaging server.

FIG. 2 is a block schematic diagram illustrating a system 200 for providing instant messaging information according to one embodiment of the present invention. The operation of the system of FIG. 2 may be easier to understand when described relative to a sample environment, and so FIG. 3 is also presented for that purpose. Referring now to FIGS. 2 and 3, FIG. 3 contains two systems 200A, 200B, which are each similar or identical to system 200 of FIG. 2 and operate on a conventional computer system. Each system 200A, 200B are coupled to one or more programs at least similar to programs 240,242. Systems 200A, 200B are coupled to instant messaging server 300 via network 320. Instant messaging server 300 is a conventional instant messaging server, or one that is modified to operate in the manner described herein, that authenticates client systems of users and/or applications, or authenticates the users or applications themselves, and then once authenticated, allows communication among the authenticated entities.

Network 320 is a conventional network such as the Internet or a conventional local area network. Instant messaging client 310 is a conventional instant messaging client, such as the conventional AOL instant messenger client commercially available from America On Line Corporation, of Dulles, Va. running on a conventional computer system.

In one embodiment, all communication into or out of system 200 is made via input/output 208 of communication interface 210 which is coupled to a network, such as network 320, which as described above, may be the Internet or a local area network or both. Communication interface 210 is a conventional communication interface that supports TCP/IP, Ethernet, or other conventional communication protocols.

Log in

When system 200 is started, control is passed to network login manager 212 which authenticates itself to instant messaging server 300 via communication interface 210 and network 320. In one embodiment, a user can configure network login manager 212 (using a user interface it provides via an operating system, keyboard, mouse and monitor (not shown)), with a username and password to use to authenticate itself to instant messaging server 300. The domain name or IP address of instant messaging server 300 may be prestored in network login manager 212, though in another embodiment, the domain name or IP address is received from the user via a user interface provided by network login manager 212 or selected from a list of possible instant messaging servers that network login manager 212 stores with their associated IP addresses or domain names. Although an instant messaging server is described herein, other embodiments employ a point-to-point communication technique, allowing instant messaging server 300 to be eliminated.

Once network login manager 212 has authenticated itself as described above, network login manager 212 signals network receive manager 214 and network provide manager 234 with sufficient information to allow them to communicate with instant messaging server 300, such as by providing a handle to a socket connection it arranged with communication interface 210 to communicate with server 300 as described above, and optionally the user identifier it used to log in. When signaled, and if necessary, network receive manager 214 arranges with communication interface 210 to receive all communications sent to the port corresponding to that socket connection to allow network receive manager 214 to receive instant messages from server 300 that are sent to communication interface 210.

Notification of Programs that Network is Available

When network login manager 212 has authenticated itself as described above, network login manager 212 additionally signals program request manager 230. The identifiers of any applications of programs 240, 242 that have previously sent network login manager 212 a request to be notified when access to the instant messaging system is available are stored internally by program request manager 230 and program request manager 230 notifies them that instant messaging communications are available upon receiving the signal from network login manager 212. Other applications of programs 240, 242 that make such a request subsequent to network login manager 212 signaling program request manager 230 are promptly notified by program request manager 230 that such communications are available and program request manager 230 stores their identifiers as well. In one embodiment, if network login manager 212 determines that communications with the instant messaging server 300 have been interrupted, it notifies all applications of programs 240, 242 from which it received requests. The applications of such programs that make all such requests are referred to herein as the "registered applications".

Receipt of Instant Messages

In one embodiment, instant messages are received as one or more conventional TCP/IP communications and assembled into an instant message by network receive manager 214. When network receive manager 214 has assembled an instant message, it stores it, along with the date and time of receipt in one embodiment, into message storage 220. Message storage 220 in arranged as a table of messages, and may contain conventional memory or disk storage. Each instant message received by communication interface 210 from instant message server 300 is stored into message storage in this fashion.

In one embodiment, each instant message contains a number of fields, such as the sender's user identifier, profile or other information about the user that the user has previously provided, status information described in more detail below, message text, and the like. Network receive manager 214 separates the fields and stores each instant message as a set of fields.

In one embodiment, network receive manager 214 assigns the message a unique identifier if such an identifier is not assigned to the message by the instant messaging server 300 or the sending entity. If network receive manager 214 assigns the identifier, it stores it as part of the message in message storage 220.

In one embodiment, network receive manager 214 signals program request manager 230 with the identifier of each message it receives as described above. In response, program request manager 230 provides the identifier of the message to all registered applications.

Retrieval of Messages

Programs 240, 242 can request and receive instant messages (and as described below, status messages) that have been stored into message storage 220, as will now be described. Each program 240, 242 may be any conventional application program. In one embodiment, programs 240, 242 may be a conventional central program element, including an agent, application, or pod, described in the related applications. For example, program 240, may be a program element, such as an agent of a program, and program 242 may be a pod or other portion of the same program. Although two programs 240, 242 are shown in the Figure, there may be any number of programs similar to programs 240, 242 that may be in communication with program request manager 230, described in more detail below.

In one embodiment, system 200 is arranged as one such agent, and programs 240, 242 are agents of other programs. System 200 may communicate with programs 240, 242 via the agent manager described in the related applications.

To request instant messages, program 240 or 242 provides program request manager 230 with a request for one or more instant messages. As described above, each instant message may contain one or more fields, such as a sender identifier, text, and the date and time of receipt, and the request may contain criteria containing values of these fields. For example, a request could have a criteria indicating the program 240 or 242 wishes to receive instant messages having a date and time field greater than today at 10:04 am, a sender field that does not contain "getihtgdt" and a text field containing the word "yesterday". Any conventional method of specifying a criteria may be used in a request, including the specification of wildcards and the like.

Program request manager 230 receives the request and provides its criteria to message locator 232, which scans message storage 220 for messages that match the criteria it receives. Message locator 232 builds a response record that contains the request and all of the messages that meet the criteria, and returns the response record to program request manager 230, which provides the response record to the program 240 or 242 from which the request corresponding to the response record was received.

In one embodiment, each program 240, 242 has an identifier that it sends with the request for one or more messages. Program request manager 230 provides the program identifier to message locator 232, which associates the program identifier of the requesting program 240, 242 with the messages it identifies as corresponding to the criteria, for use as described below.

Each program 240, 242 can request one or more of the same messages already requested by another program or messages not so requested. Each program 240, 242 can take action based on any field of any number of one or more received messages or the combination of any number of fields of any number of one or more received messages.

Presence Information

In one embodiment, each instant message stored in message storage 220 includes a field that describes the status of the user from which each message is received. The status may include information that is automatically detected, (e.g. online or offline) or information that may be provided to the instant messaging server 300 by an instant messaging client 320 or system 200A, 200B in response to user input by the user of that client 320 or system 200A, 200B, such as an indication that the user is logged on, but is away from, or not paying attention to, the computer system running the client 320 or system 200A, 200B. When the instant messages are retrieved, the status information is provided with the message to the application 240, 242 that requested it. It isn't necessary to store status information in the same area of message storage 220, as is used to store instant messages, as different areas may be used In one embodiment, current status about a particular user identifier may be requested by a program 240, 242 by sending to program request manager 230 a status request, with a user identifier for which the status is being requested and an optional identifier of the program for which status is being requested. In one embodiment, when program request manager 230 receives the status request, it provides it to network provide manager 234, which builds a network status request, which is a type of status request in a format readable by instant messaging server 300 and contains the user identifier for which status is requested and the program identifier of the program from which the status request was received. Network provide manager 234, provides the network status request to instant messaging server 300 via communication interface 210 and network 320, for example, using the socket corresponding to the handle it received as described above.

It isn't necessary that the socket handle be passed as described herein, as communication interface 210 may contain software that receives and forwards information to and from the remainder of communication interface as described herein, and that software uses the socket connection to and from server 234. In other embodiments, the elements that communicate with the server as described herein may do so vie their own socket connections.

Instant messaging server 300 checks the program identifier in the request and if the program identifier matches a program identifier on a list of valid program identifiers it maintains, instant messaging server identifies the status corresponding to the network status request and returns to the requesting system 200 a network status message containing the status of the user corresponding to the identifier in the network status request. Communication interface 210 receives the network message and provides it to network receive manager 214, which identifies the message as a network status message from a flag in the message, and provides the network status message to program request manager 230.

When it receives the network status message, program request manager 230 identifies the program 240, 242 that sent the corresponding status request. This may be accomplished by program request manager 230 saving the identifiers of the programs from which the status request was received in the order in which the network status messages were sent, and determining the program to which the network status message corresponds using the order of received status request messages (assuming the order of network status messages is the same as the order of the corresponding network status request), or by saving in a list the identifier of the program 240, 242 with an identifier of the network status request that is generated by program request manager 230. The identifier of the network status request is sent with the request and is received with the network status message and matched with the identifier in the list to allow identification of the program that sent the status request.

It is not necessary that the program identifier is sent with the network status request. In one embodiment, the first time a program 240,242 sends program request manager 230 any form of request as described herein (e.g. the request to be notified that access to the instant messaging system is available), program request manager 230 receives the program identifier from that program 240,242, either as part of the request or in addition to it. Program request manager 230 sends the program identifier to instant messaging server 300 or another server (not shown) and that server receives the program identifier, validates it, and sends program request manager 230 an indication as to whether the program identifier has been provided to it by a system administrator as a valid program identifier. If so, program request manager 230 processes all requests from that program 240,242, and otherwise it refuses to process such requests and/or responds to them only with an error when it is notified that the program identifier is invalid. The operator of the instant messaging network may sell the valid program identifiers (e.g. because it maintains a list of all validated programs). In another embodiment, instead of individually sending status requests, or in addition to them, each program 240, 242 may send to program request manager 230 a "buddy list" or list of user identifiers received from the programs 240,242 for which it may wish to track any changes in status. Program request manager 230 maintains a master buddy list of user identifiers from all such programs 240, 242 from which such a buddy list information has been received. The master buddy list contains the user identifiers and an identifier of the program or program from which the user identifier was received.

When a program 240, 242 sends a buddy list or addition, program request manager 230 updates the master buddy list by adding the buddy list or user identifier received, and the identifier of the program 240, 242 to the master buddy list. When a program removes its buddy list, deletes an entry or logs out, program request manager 230 removes the program identifier corresponding to the requested from the indicated user identifier or from all of the user identifiers for that program 240, 242, and deletes from the master buddy list any user identifier that does not have an associated program identifier.

In one embodiment, programs 240, 242 periodically send messages to program request manager 230 to allow it to determine whether the program 240, 242 is still active. Program request manager 230 timestamps the messages and stores the timestamp from each program, and periodically compares the last timestamp from each program 240 242 with the current time to allow program request manager 230 to determine whether the program 240, 242 has stopped responding or unexpectedly terminated. If the difference between the last timestamp received from a program and the current time exceeds a threshold amount, program request manager 230 treats that program as having requested the removal from the master buddy list of all of the user identifiers it has stored on the master buddy list as described above.

Each time program request manager 230 adds or removes a user identifier from the master buddy list, it sends (via network provide manager 234, communication interface 210, network 320) to server 300 the user names on the master buddy list or an indication of the differences between the master buddy list and the list held by server 300 so that server 300 can update the buddy list it maintains for system 200.

When a user is added to the buddy list and sent to the server 300, server 300 provides a status message to system 200 that includes the current status of that user. When server 300 detects or receives a status change from a user having a user identifier on the master buddy list provided by system 200, it sends to system 200 a status message that contains the new status of that user, with the user identifier of the user for which status is being provided as the sender of the message. Communication interface 210 processes the status message in the same manner as it processes instant messages as described above, to allow its storage into message storage 220 and the notification of registered applications. A field in the instant message may identify the message as a status-only message.

One such instant message contains status that the user has logged out, either because the instant messaging server 300 received a log out message, or failed, within a specified period of time, to receive a periodic message indicating that an instant messaging client 310 or system 200A,200B is still active. In one embodiment, network provide manager 234 periodically provides such messages to instant messaging server 300 to allow the status of system 200 to be determined by instant messaging server 300 in the same manner.

A program 240, 242 can retrieve status for a user identifier by retrieving status messages from that user in the same manner that the program retrieves instant messages as described above. In one embodiment, status messages and instant messages have a similar or identical format, though the value of a flag allows the determination as to whether the message is a status message or instant message, and all such messages are stored together in message storage 220. A program can request both status messages and instant messages simultaneously, or request one type or another by specifying the value of the flag as one of the criteria.

When the program receives messages that include status messages or instant messages, the program 240, 242 can take action based on the status of one or more remote user identifiers.

Deleting Messages from Message Storage

In one embodiment, a program 240, 242 may provide an indication to program request manager 230 to delete one or more instant messages, status messages, or both, stored in message storage 220 as described above. In such embodiment, a program 240, 242 may provide either identifiers of messages or criteria of messages to be deleted. The identifiers may be any unique identifiers of each of the messages that are assigned to messages as they are received by network receive manager 214 as described above or any other identifiers that individually specify a specific message that may be, or is, stored in message storage 220. The message identifiers are stored as part of the messages stored in message storage 220, and are provided to the programs 240, 242 with any messages as described above. A program 240, 242 can thus receive one or more messages, and then delete any of the messages received using the identifier received with the message in a request to delete any such messages.

To delete a message, a program 240, 242 sends to program request manager 230 a deletion request, with one or more message identifiers of the messages to be deleted. Program request manager 230 provides the identifiers of the messages to deletion manager 250, which deletes the specified messages from message storage 220.

In one embodiment, instead of providing one or more message identifiers, a program 240 may provide in the deletion request a criteria for the messages to be deleted in the same manner that messages were requested as described above. In such embodiment, program request manager 230 provides the request to deletion manager 250, which deletes from message storage 220 the messages meeting the criteria included with the request.

In one embodiment, certain safeguards are in place to ensure that one program 240 does not delete messages intended for another program 242. For example, in one embodiment, each program 240, 242 provides a program identifier when it requests messages as described above and when messages are provided as described above, message locator 232 marks the message with the identifier of the program 240, 242 requesting it as described above. When a program deletes a message as described above, the program identifier of the message is flagged for deletion by deletion manager 250 and deletion manager 250 only deletes the message if all of the programs that had requested it also requested deletion of that message. In another embodiment, buddy lists received by the programs 240, 242 are maintained in message storage 220 with the identifier of the program by program request manager 230 and each program 240, 242 provides to program request manager 230 its identifier with the request to delete one or more messages. Deletion manager 250 receives the program identifier from program request manager 230, looks up in message storage 220 the buddy list for that program and only deletes a message on request as described above if the sender of the message is on the program's buddy list.

In still another embodiment, messages are deleted from message storage 220 by message locator 232 after it provides the message as described above. In such embodiment, no such message deletion command need be used.

In still another embodiment, messages are deleted from message storage 220 if a user logs out and a different user logs in. In such case, network login manager 212 either receives an indication of the occurrence of such event or allows logins and logouts through a user interface it displays as a conventional application or pod, and signals deletion manager 250 to delete all of the messages in message storage 220 and deletion manager 250 complies.

Sending Messages.

In one embodiment, at any time, a program may send a message sending request to program request manager 230. The message sending request contains the identifier of the user to whom the message should be sent as well as the contents of the message. Program request manager 230 provides this information in the request to network provide manager 234, which formats the information, as well as the user name assigned to system 200 and, optionally, the program identifier into a message sending request that can be interpreted as an instant message by the instant messaging server 300 and sends the message to instant messaging server 300, which appends the status information it has for the sending user name in the message and forwards the message, for example to instant messaging client 310 or systems 200A, 200B corresponding to the specified recipient's user identifier. The instant messaging server 300 may validate the program identifier or it may be validated by program request manager 230 as described above.

If the specified recipient is not logged in, an error message will be received as an instant message, and the message is received and stored as described above. The message may contain a field indicating that it is an error message, sent by the intended recipient of the original message to its sender so that the program that sent the message can check to determine if an error message was received by searching on those fields shortly after sending the message.

Away from Desk

In one embodiment, a user can click a user interface element in an application or pod provided as part of network login manager 212 to indicate that the user is away from his desk. Network login manager 212 provides the status to the server and signals network receive manager 214, which stores the instant messages and status messages in message storage 220 as described above, flags the messages with an "away" flag, but does not provide the identifier to program request manager 230 and so registered applications will not be notified of the receipt of any such messages as described above. When the user indicates using a user interface element displayed as part of the pod or application of network login manager 212, it so indicates to network receive manager 214, which scans message storage 220, and removes any away flags, for each away flag removed from a message, provides the registered applications with the identifier of that message. Additionally, network receive manager 214 resumes notifying the registered applications of the receipt of any messages.

Type Identifier.

In one embodiment, each instant message (or anything) sent to instant messaging server 300 by system 200 must have a type identifier, and ordinarily, this type identifier is the same as is used to send instant messages from one instant messaging client to another. Network provide manager 234 or communication interface 210 adds the type identifier to the message.

However, if a computer system contains a conventional instant messaging client, such as instant messaging client 310, as well as a system 200, the user will see on his or her instant messaging client messages received for system 200. To avoid this situation, systems 200A 200 may utilize a different type identifier for information they send to one another. In such embodiment, the instant messaging client will reject messages that have the different type identifier. System 200 may either accept messages (e.g. status messages and instant messages) having all type identifiers, or all type identifiers except those used by instant messaging clients.

Data Channels

In one embodiment, the system and method could be used to send data identified as having a particular format, such as a rich description format such as XML. In this embodiment, programs 240, 242 register with program request manager 230 that they are able to read the format, and program request manager 230 maintains a list of the program identifiers that can read that format.

When the first such program is added to the list, program request manager 230 provides a status change request to network provide manager 234 that indicates that system 200 can read that format. Network provide manager 234 formats the status change request and the user identifier, and type identifier into a command that will be accepted by instant server 300 to change either the status information sent with status messages and instant messages, or status information that can be requested as described above, or both. Network provide manager 234 then sends such status command to instant messaging server 300, which records the status information from the command for the user identifier corresponding to system 200. As status information is sent by instant messaging server 300 regarding the specific instance of system 200, e.g. system A 200A, the information will indicate that the user identifier corresponding to system 200A can read the format.

As programs 234 send commands to log out or as they time out as described above, program request manager 230 checks the list of programs able to read the format and removes the program from the list. If the last program 240, 242 is removed from the list, program request manager 230 builds another status change request to remove the indication that system 200A can read the format, sends the request to network provide manager 234, which formats it into a command in a manner similar to that described above and sends it to server 300, which removes the indication corresponding to the user identifier of system 200A that system A 200A can read the format.

At system B 200B, a user may instruct a program (or the program may determine without user input) that data (e.g. data the user has highlighted, or any other type of data) should be sent to a particular user or group of users. The program 240, 242 can then request status information for the user or each such user in the group of users using any of the techniques described above. For any such user, if the status information for that intended recipient user indicates that the user has a program that can read the format, the program places the data into that format and includes it as the text of one or more instant messages to be sent to such recipient user, and marks the message as a message in that format. The message is sent as described above and received as described above. If the status information for a user indicates that the user cannot read the format, the program 240, 242 can instruct any user that has requested data to be sent to a recipient user that the requested recipient user cannot receive data in the proper format and does not send the data.

In one embodiment, instead of a single format, many different formats are possible and each program 240, 242 registers with program request manager 230 all the formats it can accept. An identifier of each such format is similarly registered with instant messaging server 300 during such time as any program is in communication with program request manager (e.g. hasn't logged out or timed out). When another system intends to send data in a particular format, it checks the status of the intended recipient to determine if the user can receive data in that format in the manner described above and sends the data or does not send the data (and optionally indicates to any requesting user that the data cannot be sent to the recipient) based on the status.

As noted above, a program can log out from program request manager 230. To do so, the program sends a log out request to program request manager 230, which updates information about the status of that program as described herein.

Figure 4:
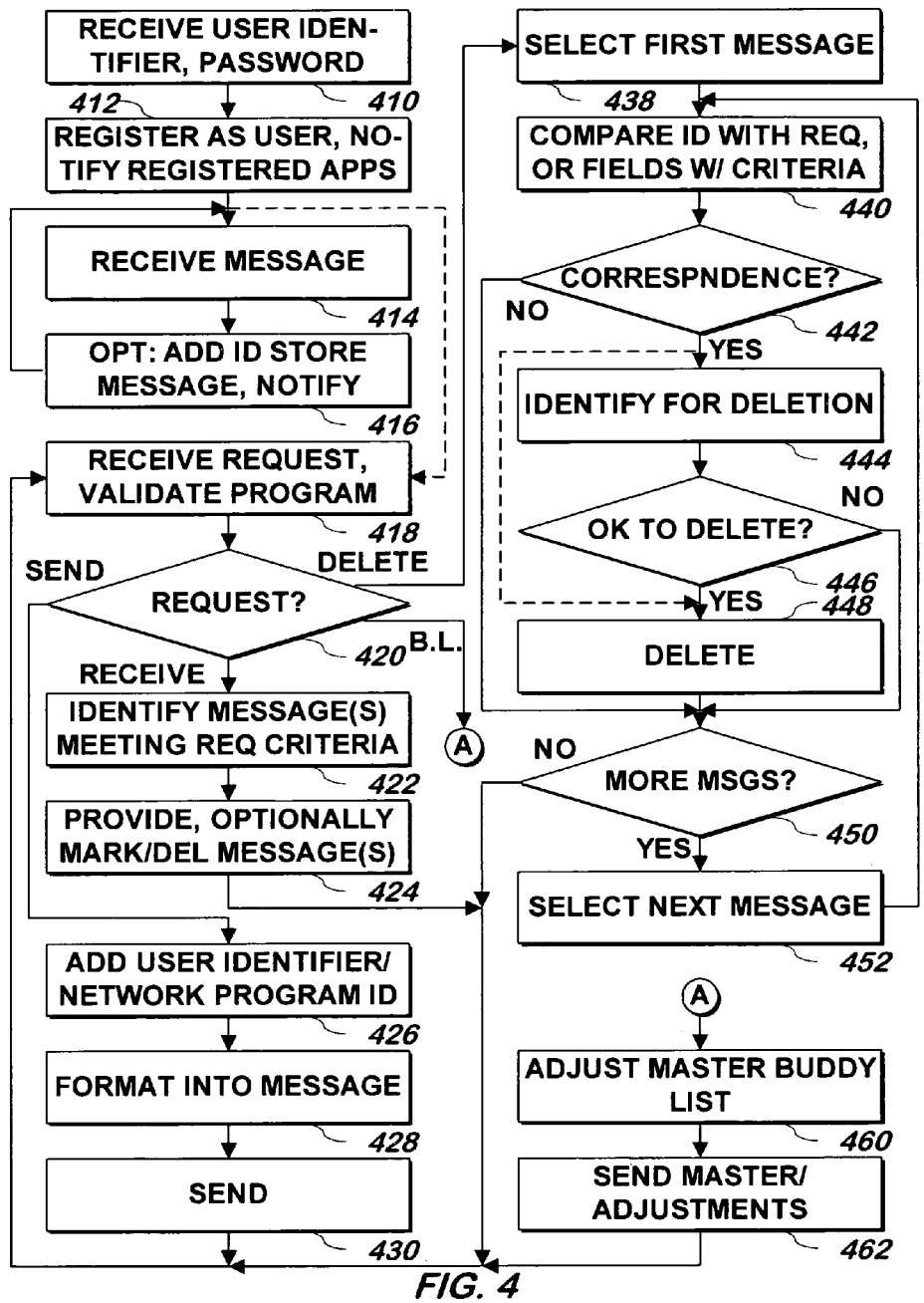
FIG. 4 is a flowchart illustrating a method of communicating instant messaging information according to one embodiment of the present invention.

Referring now to FIG. 4, a method of communicating instant message information is shown according to one embodiment of the present invention. Although a server is used as described herein, direct communication between programs may be used.

A user identifier and optionally a password of the instant messaging system is received 410 either from the user of the system or automatically, as part of a set up operation on the user's computer system. The user identifier and password is used to register with the instant messaging server as a user of the instant messaging system 412 and the method continues at step 414 and 418. Step 410 may include receiving an identifier of the instant messaging server as described above. Step 412 may include notifying applications of programs that have requested access to an instant messaging network that the network is available.

At step 414, an instant message is received and the message received is stored in a buffer 416 and the method continues at step 414. An instant message may include text, status, or other information and an instant message may be sent from an application, or provided automatically by a server due to a detection in a change in status. Step 416 may include adding an identifier to the message to allow it to be referenced as described herein. Step 416 may include adding the date and time of receipt of the message or another time if such information is not provided by the message sender or the instant messaging server. Step 416 may include notifying registered applications that a message has been received, and optionally providing an identifier of that message as part of such notification, unless the user has indicated that he or she is "away" as described above.

At step 418, which follows sometime after step 412 as indicated by the dashed line in the Figure, a request is received from a program, which may be one of several programs and the method continues at step 420. Step 420 may include validating the program's use of the instant messaging network as described above, and rejecting the request if the program is not valid. At step 420, if the request received in step 418 is a request to receive one or more messages stored in one or more iterations of step 416, the request may contain a criteria, and the stored messages meeting the criteria are identified 422 and the messages are provided 424 to the program from which the request was received. In one embodiment, step 424 includes marking in the buffer such messages being provided with an identifier of the program that requested them, or deleting them, as described above. The method continues at step 418.

If the request received in step 418 is a request to send a message 420, a user identifier and optionally, a program identifier is added to the information from the request 426 and this information is formatted into a format of an instant message for receipt by an instant messaging server 428. The message is sent to an instant messaging server 430 and the method continues at step 418.

If the request received in step 418 is a request to delete one or more messages 420, the request may contain one or more message identifiers or criteria corresponding to the one or more messages to be deleted and the method continues at step 438. At step 438, a first message stored is selected and either its identifier is compared with the one or more identifiers in the request or its fields are compared with the one or more criteria in the request 440. If there is a correspondence between the identifier of the selected message and the one or more identifiers specified in the request, or between one or more fields of the selected message and the one or more criteria specified in the request 442, the message is identified for deletion 444, for example as described above. If the message is OK to delete as described above 446, the message is deleted from the buffer 450 and the method continues at step 450 and otherwise 446, the method continues at step 450. In one embodiment indicated by the dashed line in the figure, steps 446 and 448 are omitted and step 448 follows the yes branch of the decision of step 442.

At step 450, if there are additional messages that have been stored but not yet identified for deletion (or deleted) according to the request, the next such message is selected 452 and the method continues at step 440 and otherwise 450, the method continues at step 418.

If the request received in step 418 is a request to adjust a buddy list, the master buddy list is adjusted 460 in accordance with the request, either by adding one or more user names (and associating with it the program name from which the request was received) or by removing the program name from the user identifier or identifiers in the request, and if no more program names are associated with the user name, removing the user name from the master buddy list. The server is updated 462 with the adjusted buddy list or sent instructions that allow the server to do so 462, and the method continues at step 418. The server may send status information in response to the update, and such information will be received in the form of an instant message, and processed as described above in steps 414 and 416 above.

What is claimed is:

1. A method of allowing a plurality of programs to communicate via an instant messaging network, comprising:
   obtaining authentication information, including a program identifier for at least one of the plurality of programs;
   providing the authentication information to the instant messaging network;
   providing a notification to the plurality of programs that instant messaging network communication is available;
   receiving communications over the instant messaging network on behalf of the plurality of programs;
   storing the communications received over the instant messaging network for the at least one of the plurality of programs when the at least one of the plurality of programs is unable to accept communications from the instant messaging network;
   receiving criteria from the at least one of the plurality of programs;
   making at least one of the stored communications available to the at least one of the plurality of programs;
   wherein making at least one of the stored communications available to the at least one of the plurality of programs further comprises providing from the at least one of the stored communications a communication that meets the criteria to the at least one of the plurality of programs; and
   wherein the providing from the at least one of the stored communications a communication that meets the criteria to the at least one of the plurality of programs comprises providing to the program from which the criteria was received, a message corresponding to the criteria from messages for the at least one of the plurality of programs that have not already been provided to the at least one of the plurality of programs, wherein the criteria are selected from the group consisting of a sender identifier, text of the communication, a date of the communication, and a time of receipt of the communication.

2. The method of claim 1, wherein:
   some of the stored communications comprise messages and other of the stored communications comprise status information;
   the criteria apply to the messages; and
   the providing from the at least one of the stored communications a communication that meets the criteria to the at least one of the plurality of programs comprises providing to the program from which the criteria was received, a message corresponding to the criteria.

3. The method of claim 2, additionally comprising providing, with the message corresponding to the criteria, status information corresponding to the message provided.

4. The method of claim 1, additionally comprising:
   receiving a status request describing a user from one of the plurality of programs;
   providing a network status request corresponding to the status request about the user to the instant messaging network;
   receiving a response to the network status request from the instant messaging network; and
   providing at least a portion of the response to the one of the plurality of programs from which the request was received.

5. The method of claim 1, additionally comprising:
   receiving from one of the plurality of programs, a request to add at least one user identifier to be added to, or remove at least one user identifier from, a list of buddies for which status information can be received from the instant messaging network;
   responsive to a request to add at least one user identifier to the buddy list:
      adding any user identifiers from the request that are not on the buddy list at the time the request is received and providing information regarding a first state of the buddy list to the instant messaging network responsive to at least one of the user identifier not being on the buddy list at the time it was received in the request; and
      associating in the buddy list an identifier of the program with the user identifier;
   responsive to a request to remove at least one user identifier from the buddy list:
      disassociating in the buddy list an identifier of the program with the at least one user identifier in the request;
      removing any user identifier from the buddy list that is not associated with an identifier of one of the plurality of programs; and
      responsive to at least one user identifier being removed from the buddy list, providing information regarding a second state of the buddy list to the instant messaging network;
   receiving from the instant messaging network status information corresponding to at least one of the user identifiers on the buddy list; and
   for each of the at least one user identifier in the network status information that is on the buddy list:
      identifying at least one of the plurality of programs to which the status information corresponds; and
      providing at least a portion of the status information for said user identifier to the at least one program identified.

6. The method of claim 5, additionally comprising:
   monitoring a status of each of the programs associated with user identifiers on the buddy list; and
   responsive to the status of each of the programs monitored indicating that at least one of the programs associated with user identifiers on the buddy list is not operational, for each such program:
      disassociating in the buddy list the identifier of the program with all user identifiers in the buddy list with which the program is associated;
      removing any user identifier from the buddy list that is not associated with an identifier of one of the plurality of programs; and
      responsive to at least one user identifier being removed from the buddy list, providing information regarding a third state of the buddy list to the instant messaging network.

7. The method of claim 1, further comprising
   obtaining an indication of formats the at least one of the plurality of programs can read; and
   wherein the storing is responsive to a type of the communication corresponding to a format of the formats the at least one of the plurality of the programs can read.

8. The method of claim 1, additionally comprising:
   receiving at least one communication from a first of the plurality of programs, the received communication being of a type different from that used by an instant messaging client and comprising an identifier indicating the received communication is intended for other than an instant message client; and providing at least a portion of each of the received communication over the instant messaging network to a second program of the plurality of programs, the portion being of a type different from that used by the instant messaging client, wherein the plurality of programs are other than instant messaging clients.

9. A system for allowing a plurality of programs to communicate via an instant messaging network, comprising:

a storage device operable to store software instructions; and a processor operable to interact with the storage device, to retrieve and execute software instructions embodying modules comprising:

a network login manager having a first output coupled to the instant messaging network for providing authentication information, including a program identifier for at least one of the plurality of programs, to the instant messaging network as part of an authentication process, and a second output for providing an indication that the network login manager has completed the authentication process;

a program request manager having an input coupled to the network login manager second output for receiving the indication, the program request manager for providing at an output a notification to the plurality of programs that instant messaging network communication is available;

a network receive manager having an input coupled to the instant messaging network for receiving communications over the instant messaging network on behalf of the plurality of programs, the network receive manager for storing via an output the communications received over the instant messaging network for the at least one of the plurality of programs when the at least one of the plurality of programs is unavailable for accepting communications;

the program request manager additionally comprises a request input for receiving criteria from the at least one of the plurality of programs and a messages input coupled to the network receive manager output for receiving at least one of the stored communications, the program request manager additionally for making the at least one of the stored communications available to the at least one of the plurality of programs via the program request manager output, wherein the program request manager makes available the at least one of the stored communications by providing at the program request manager output a communication that meets the criteria received; and wherein the program request manager provides a communication that meets the criteria by providing to the program from which the criteria was received, a message corresponding to the criteria from messages for the at least one of the plurality of programs that have not already been provided to the at least one of the plurality of programs, wherein the criteria are selected from the group consisting of a sender identifier, text of the communication, a date of the communication, and a time of receipt of the communication.

10. The system of claim 9, wherein:

some of the stored communications comprise messages and other of the stored communications comprise status information;

the criteria apply to the messages; and the program request manager provides a communication that meets the criteria by providing to the program from which the criteria was received, a message corresponding to the criteria.

11. The system of claim 10, wherein the program request manager is additionally for providing, at the program request manager output with the message corresponding to the criteria, status information corresponding to the message provided.

12. The system of claim 9:

wherein the program request manager additionally comprises a request input for receiving a status request describing a user from one of the plurality of programs, the program request manager additionally for providing at a status input/output the status request;

additionally comprising a network provide manager having an input for receiving the status request, the network provide manager for providing at an output coupled to the instant messaging network a network status request corresponding to the status request about the user to the instant messaging network;

additionally comprising a network receive manager having an input coupled to the instant messaging network for receiving a response to the network status request from the instant messaging network, the network receive manager for providing at least a portion of the response at an output; and wherein the program request manager additionally comprises a response input coupled to the network receive manager output for receiving the at least the portion of the response, and the program request manager is additionally for providing at the program request manager output the at least the portion of the response to the one of the plurality of programs from which the request was received.

13. The system of claim 9:

wherein the program request manager additionally comprises a second input for receiving from one of the plurality of programs, a request to add at least one user identifier to be added to, or remove at least one user identifier from, a list of buddies for which status information can be received from the instant messaging network, the program request manager additionally for:

responsive to a request to add at least one user identifier to the buddy list:

adding any user identifiers from the request that are not on the buddy list at the time the request is received and providing information regarding a first state of the buddy list to a network output coupled to the instant messaging network responsive to at least one of the user identifier not being on the buddy list at the time it was received in the request; and associating in the buddy list an identifier of the program with the user identifier;

responsive to a request to remove at least one user identifier from the buddy list:

disassociating in the buddy list an identifier of the program with the at least one user identifier in the request;

removing any user identifier from the buddy list that is not associated with an identifier of one of the plurality of programs; and responsive to at least one user identifier being removed from the buddy list, providing information regarding a second state of the buddy list to the network output;

receiving from the instant messaging network status information corresponding to at least one of the user identifiers on the buddy list; and for each of the at least one user identifier in the network status information that is on the buddy list:

identifying at least one of the plurality of programs to which the status information corresponds; and providing at the program request manager output at least a portion of the status information for said user identifier to the at least one program identified.

14. The system of claim 13, wherein the program request manager is additionally for:
- monitoring via a program input/output a status of each of the programs associated with user identifiers on the buddy list; and
- responsive to the status of each of the programs monitored indicating that at least one of the programs associated with user identifiers on the buddy list is not operational, for each such program:
  - disassociating in the buddy list the identifier of the program with all user identifiers in the buddy list with which the program is associated;
  - removing any user identifier from the buddy list that is not associated with an identifier of one of the plurality of programs; and
  - responsive to at least one user identifier being removed from the buddy list, providing information regarding a third state of the buddy list to the network output.

15. The system of claim 9, wherein the program request manager obtains an indication of formats the at least one of the plurality of programs can read; and
- wherein the network receive manager stores the communications responsive to a type of the communication corresponding to a format of the formats the at least one of the plurality of the programs can read.

16. The system of claim 9, wherein:
- the program request manager additionally comprises a program input for receiving at least one communication from a first of the plurality of programs, the received communication being of a type different from that used by an instant messaging client and comprising an identifier indicating the received communication is intended for other than an instant message client, and the program request manager is additionally for providing the at least a portion of each of the at least one communication to a network output coupled to the instant messaging network; and
- the at least the portion of each of the at least one of the communications is provided over the instant messaging network to a second program of the plurality of programs, the portion being of a type different from that used by the instant messaging client, wherein the plurality of programs are other than instant messaging clients.

17. A computer program product comprising a computer useable medium having computer readable program code embodied therein for allowing a plurality of programs to communicate via an instant messaging network, the computer program product comprising computer readable program code devices configured to cause a computer system to:
- obtain authentication information, including a program identifier for at least one of the plurality of programs;
- provide the authentication information to the instant messaging network;
- provide a notification to the plurality of programs that instant messaging network communication is available;
- receive communications over the instant messaging network on behalf of the plurality of programs;
- store the communications received over the instant messaging network for the at least one of the plurality of programs when the at least one of the plurality of programs is unavailable for accepting communications;
- receiving criteria from the at least one of the plurality of programs;
- make at least one of the stored communications available to the at least one of the plurality of programs;
- wherein to make at least one of the stored communications available to the at least one of the plurality of programs further comprises to provide from the at least one of the stored communications a communication that meets the criteria to the at least one of the plurality of programs; and
- wherein the computer readable program code devices configured to cause the computer system to provide from the at least one of the stored communications a communication that meets the criteria to the at least one of the plurality of programs comprise computer readable program code devices configured to cause the computer system to provide to the program from which the criteria was received, a message corresponding to the criteria from messages that have not already been provided to the at least one of the plurality of programs, wherein the criteria are selected from the group consisting of a sender identifier, text of the communication, a date of the communication, and a time of receipt of the communication.

18. The computer program product of claim 17, wherein:
- some of the stored communications comprise messages and other of the stored communications comprise status information;
- the criteria apply to the messages; and
- the computer readable program code devices configured to cause the computer system to provide from the at least one of the stored communications a communication that meets the criteria to the at least one of the plurality of programs comprise computer readable program code devices configured to cause the computer system to provide to the program from which the criteria was received a message corresponding to the criteria.

19. The computer program product of claim 18, additionally comprising the computer readable program code devices configured to cause the computer system to provide, with the message corresponding to the criteria, status information corresponding to the message provided.

20. The computer program product of claim 17, additionally comprising computer readable program code devices configured to cause the computer system to:
- receive a status request describing a user from one of the plurality of programs;
- provide a network status request corresponding to the status request about the user to the instant messaging network;
- receive a response to the network status request from the instant messaging network; and
- provide at least a portion of the response to the one of the plurality of programs from which the request was received.

21. The computer program product of claim 17, additionally comprising computer readable program code devices configured to cause the computer system to:
- receive from one of the plurality of programs, a request to add at least one user identifier to be added to, or remove at least one user identifier from, a list of buddies for which status information can be received from the instant messaging network;
- responsive to a request to add at least one user identifier to the buddy list:
  - add any user identifiers from the request that are not on the buddy list at the time the request is received and providing information regarding a first state of the buddy list to the instant messaging network responsive to at least one of the user identifier not being on the buddy list at the time it was received in the request; and associate in the buddy list an identifier of the program with the user identifier;

responsive to a request to remove at least one user identifier from the buddy list:
- disassociate in the buddy list an identifier of the program with the at least one user identifier in the request;
- remove any user identifier from the buddy list that is not associated with an identifier of one of the plurality of programs; and
- responsive to at least one user identifier being removed from the buddy list, provide information regarding a second state of the buddy list to the instant messaging network;

receive from the instant messaging network status information corresponding to at least one of the user identifiers on the buddy list; and for each of the at least one user identifier in the network status information that is on the buddy list:
- identify at least one of the plurality of programs to which the status information corresponds; and
- provide at least a portion of the status information for said user identifier to the at least one program identified.

22. The computer program product of claim 21, additionally comprising computer readable program code devices configured to cause the computer system to:

monitor a status of each of the programs associated with user identifiers on the buddy list; and responsive to the status of each of the programs monitored indicating that at least one of the programs associated with user identifiers on the buddy list is not operational, for each such program:
- disassociate in the buddy list the identifier of the program with all user identifiers in the buddy list with which the program is associated;
- remove any user identifier from the buddy list that is not associated with an identifier of one of the plurality of programs; and
- responsive to at least one user identifier being removed from the buddy list, provide information regarding a third state of the buddy list to the instant messaging network.

23. The computer program product of claim 17, additionally comprising computer readable program code devices configured to cause the computer system to:

obtain an indication of formats the at least one of the plurality of programs can read; and wherein the computer readable program code devices configured to cause the computer system to store are responsive to a type of the communication corresponding to a format of the formats the at least one of the plurality of the programs can read.

24. The computer program product of claim 17, additionally comprising computer readable program code devices configured to cause the computer system to:

receive at least one communication from a first of the plurality of programs, the received communication being of a type different from that used by an instant messaging client and comprising an identifier indicating the received communication is intended for other than an instant message client; and provide at least a portion of each of the received communication over the instant messaging network to a second program of the plurality of programs, the portion being of a type different from that used by the instant messaging client, wherein the plurality of programs are other than instant messaging clients.

\* \* \* \* \*